United States Patent
Altur Sánchez et al.

(10) Patent No.: US 10,800,575 B2
(45) Date of Patent: Oct. 13, 2020

(54) RECYCLABLE CARDBOARD PALLET

(71) Applicant: Mandriladora Alpesa, S.L., Valencia (ES)

(72) Inventors: Sergio Altur Sánchez, Valencia (ES); Antonio Javier Altur Sánchez, Valencia (ES)

(73) Assignee: Mandriladora Alpesa, S.L., Tavernes de la Valldigna, (Valencia) (ES)

( * ) Notice: Subject to any disclaimer, the term of this patent is extended or adjusted under 35 U.S.C. 154(b) by 0 days.

(21) Appl. No.: 16/339,745

(22) PCT Filed: May 31, 2017

(86) PCT No.: PCT/ES2017/070377
§ 371 (c)(1),
(2) Date: Apr. 5, 2019

(87) PCT Pub. No.: WO2018/065645
PCT Pub. Date: Apr. 12, 2018

(65) Prior Publication Data
US 2020/0047947 A1   Feb. 13, 2020

Related U.S. Application Data

(60) Provisional application No. PCT/ES2017/070377, filed on May 31, 2017.

(30) Foreign Application Priority Data

Oct. 6, 2016   (ES) ................ 201631202 U

(51) Int. Cl.
*B65D 19/00* (2006.01)

(52) U.S. Cl.
CPC ............ *B65D 19/0095* (2013.01); *B65D 2519/00019* (2013.01); *B65D 2519/00054* (2013.01); *B65D 2519/00124* (2013.01)

(58) Field of Classification Search
CPC ............. B65D 19/0095; B65D 2519/00562
See application file for complete search history.

(56) References Cited

U.S. PATENT DOCUMENTS

| | | | |
|---|---|---|---|
| 4,763,799 A * | 8/1988 | Cohn ............... | A47B 31/00 108/147.13 |
| 5,289,781 A | 3/1994 | Beckway | |

(Continued)

FOREIGN PATENT DOCUMENTS

| | | |
|---|---|---|
| ES | 1138831 U | 4/2015 |
| GB | 2278593 A | 12/1994 |

OTHER PUBLICATIONS

English Translation of ES1138831 (Year: 2020).*

*Primary Examiner* — Matthew W Ing
(74) *Attorney, Agent, or Firm* — The Webb Law Firm

(57) ABSTRACT

A recyclable cardboard pallet is described herein. The pallet includes a top platform and a bottom platform formed by at least one layer of laminar components, wherein at least one of the layers of laminar components of each platform has openings, fastening components, and a frustoconical shape for inserting separators. The separators include outer tubular bodies with an inner diameter that is greater than or equal to a largest diameter of the openings, such that ends of the outer tubular body rest completely on the laminar elements between which it is located. The separators further include an inner tubular body concentric with and longer than the outer tubular body, the inner tubular body having an outer diameter configured relative to a smallest diameter of the openings, such that the outer diameter of the inner tubular body fits flush with laminar elements between which it is located.

4 Claims, 4 Drawing Sheets

(56) References Cited

U.S. PATENT DOCUMENTS

| | | | |
|---|---|---|---|
| 5,382,214 A | 1/1995 | Mano | |
| 6,123,206 A * | 9/2000 | Zaremba | A47F 5/04 |
| | | | 108/147.13 |
| 2011/0303566 A1 * | 12/2011 | Gibson | A24F 23/00 |
| | | | 206/246 |
| 2012/0240827 A1 | 9/2012 | Hidalgo | |
| 2012/0312200 A1 | 12/2012 | Monteith | |

\* cited by examiner

RECYCLABLE CARDBOARD PALLET

CROSS-REFERENCE TO RELATED APPLICATIONS

This application is the United States national phase of International Application No. PCT/ES2017/070377 filed May 31, 2017, and claims priority to Spanish Utility Model Application No. U201631202 filed Oct. 6, 2016, the disclosures of which are hereby incorporated by reference in their entirety.

BACKGROUND OF THE INVENTION

Field of the Invention

The present disclosure, as expressed by the title of this specification, relates to a recyclable pallet, made up entirely of cardboard material and wherein the fastening of the components thereof is done without staples, nails or other conventional elements, requiring only the gluing of the pieces thereof to obtain the structure of the pallet.

Description of Related Art

There are currently numerous types of pallets that are used for transport, storage and loading specific products, the pallets being made of wood, plastic or other suitable materials, although wood pallets are generally the most common, and for fastening the longitudinal members or cross members and the intermediate blocks, elements such as tacks, staples, nails or similar are required, which cause problems when recycling of the pallet, since when the wood is reused, and since it is combined with nails, staples or tacks, these metal elements can cause mechanical failure, deterioration, damage, etc. to machines or devices used to carry out the recycling process.

Document U201530445 discloses a cardboard pallet that is entirely recyclable, given that it does not incorporate staples or metal fastening elements.

This pallet is formed by a top platform and a bottom platform, joined and separated from one another by separators with which the fastening of the two platforms is carried out. The bottom platform is made up of one or more layers of longitudinal laminar elements. The top platform is also made up of one or more layers of laminar elements, each one of the layers able to be made up of a single strip, which is the size of the pallet, or of several longitudinal laminar elements that can be placed parallel or perpendicular with respect to one another in the different layers and even with respect to the longitudinal laminar elements of the bottom platform.

The separators are made up of pairs of tubular bodies, placed concentrically and without play, wherein the inner tubular body protrudes from the outer tubular body at the two ends thereof. The fastening to the platforms is done by the insertion of the two protruding ends of the inner tubular bodies into the corresponding openings made in the laminar elements of the bottom and top platforms, while the bases of the outer tubular bodies rest on the laminar elements of the platforms.

The present disclosure is aimed at the embodiment of a pallet wherein the openings of the platforms have a frustoconical configuration and the arrangement of the tubular bodies of the separators continues to be concentric, yet without being joined, being separated at least the distance between the two circumferences that make up the bases of the frustoconical geometry of the openings. The gap of the frustoconical configuration of the openings that remains when placing the inner tubular body incorporates fastening means such as mounting adhesive. By introducing the fastening means in this small gap we are able to increase the resistance and consistency of the structure of the pallet, which leads to improved load features, greater mechanical resistance and the ability to use cardboard with a lighter grammage, especially at the cylindrical supports, resulting in the use of less weight and paper.

SUMMARY OF THE INVENTION

With the aim of achieving the objectives and avoiding the previously mentioned drawbacks, the present disclosure describes a recyclable cardboard pallet made up of a top platform, a bottom platform parallel to the top platform, and separators that define the distance between the platforms and which furthermore serve as elements for joining the set of components by fastening means. Each platform is made up of at least one layer of laminar elements that incorporates openings for the insertion of the separators. The openings have a frustoconical configuration, such that the largest opening is positioned towards the inside of the pallet where the separators are located. Thus, the pallet can have through openings if the platforms incorporate a single layer of laminar elements, or blind openings if the platforms incorporate additional layers that hide the first openings.

The inner tubular body has an outer diameter of a dimension similar to the smallest diameter of the opening, fitting flush with the laminar elements in which it is placed.

This way, the fastening elements which are normally formed by a mounting adhesive, are inserted in the gap formed by the frustoconical configuration of the opening.

On the other hand, the outer tubular body has an inner diameter of a dimension that is greater than or equal to the largest diameter of the opening, the ends thereof resting completely on the laminar elements between which it is located.

In a particular joining method, the fastening element is not limited to the gap of the opening, but rather protrudes to enter into the space formed between the tubular elements. This strengthens the joining of the inner and outer tubular bodies, the attachment of the elements of pallet being highly reinforced.

Figure 1:
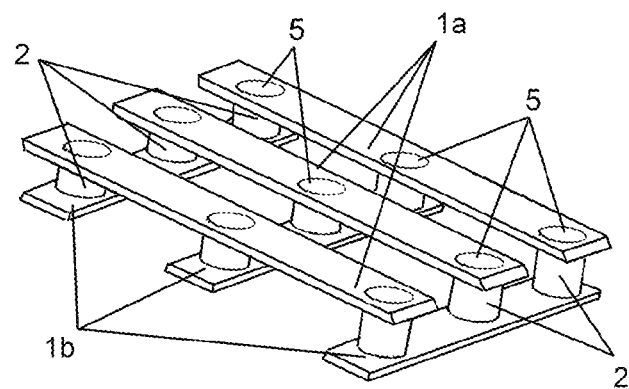
FIG. 1 shows a perspective view of a pallet made according to the object of the present disclosure. It basically comprises a top platform and a bottom platform, each one made up of a single layer of laminar elements, joined by means of separators.
Figure 2:
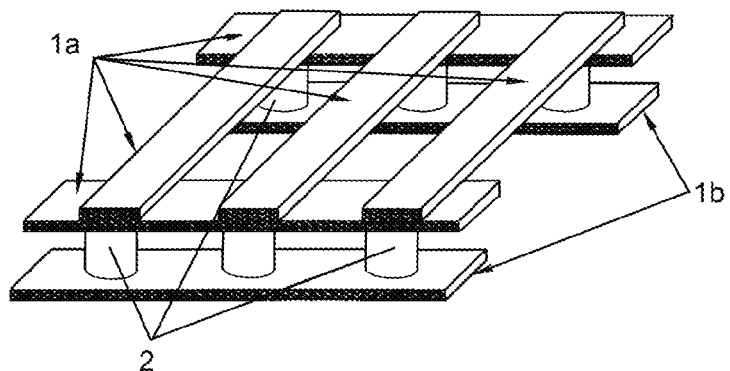
FIG. 2 shows a perspective view of a pallet wherein the top platform comprises two layers of laminar elements.
Figure 3:
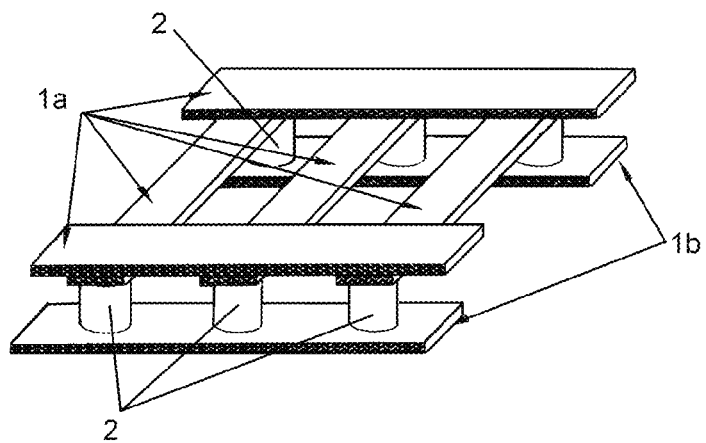
FIG. 3 shows a view that is similar to that of the preceding figure wherein the layers of laminar elements of the top platform have a different configuration to the one shown in the preceding figure.
Figure 4:
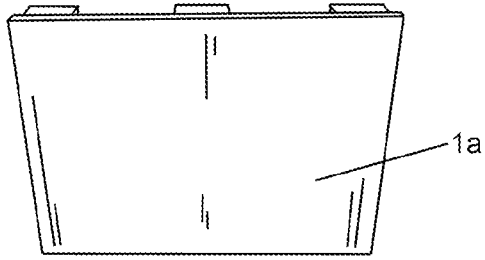
FIG. 4 shows a perspective view of a pallet wherein the top platform is made of a single laminar element that covers the entire top platform.

A list of the reference numbers used in the figures is provided below:
- 1a. Top platform.
- 1b. Bottom platform.
- 2. Separator.
- 3. Inner tubular body.
- 4. Outer tubular body.
- 5. Openings.
- 6. Fastening means.
- 7. Load.

DESCRIPTION OF THE INVENTION

Considering the numbering used in the figures, the recyclable pallet comprises a top platform (1a) and a bottom platform (1b), arranged in two parallel planes, distanced by means of a series of separators (2), which not only act as spacers but also as fastening elements for the assembly of the components of the pallet.

Both the top platform (1a) and the bottom platform (1b) can be made up of one or several layers of laminar elements.

The laminar elements, in turn, can be made up of a single element, of the size of the pallet, or by several longitudinal laminar elements. In the second case, the longitudinal laminar elements can be arranged parallel or perpendicular to one another in the different layers and with respect to the longitudinal laminar elements of the bottom platform (1b). This arrangement of the laminar elements is shown in FIGS. 1 to 4.

The separators (2) are formed by an outer tubular body (3) and an inner tubular body (4) of a greater length, which is placed concentrically, although with play, with respect to the outer tubular body (3).

Both the top platform (1a) and the bottom platform (1b) incorporate openings (5) for the insertion of the ends of the inner tubular bodies (4) of the separators (2) by means of which the pallet is configured.

In FIGS. 5 to 8 it may be seen that the openings (5) in the laminar elements are not cylindrical, but frustoconical, with the largest base in the area that is farthest inside the pallet once it is mounted. The smallest diameter of the opening (5) has a dimension similar to the outer diameter of the inner tubular body (4), which tightly fits into the same. On the other hand, the inner diameter of the outer tubular body (3) has a dimension that is greater than or equal to the largest diameter of the opening (5).

Figure 5:
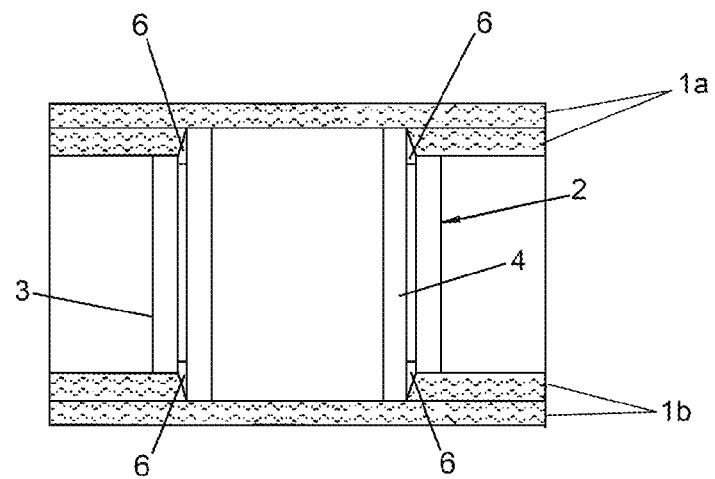
FIG. 5 shows a cross-sectional view of a part of a pallet with a separator formed by the two inner and outer tubular bodies, wherein the ends of the inner tubular body are embedded in blind openings of the top and bottom platforms.
Figure 6:
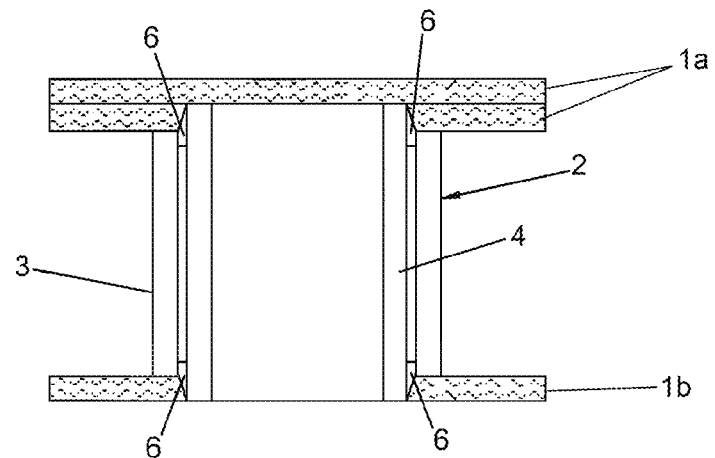
FIG. 6 shows a similar view to the one shown in the preceding figure wherein an end of the inner tubular body is embedded in a through opening of the bottom platform, while the other end of the inner tubular body is embedded in a blind opening of the top platform.
Figure 7:
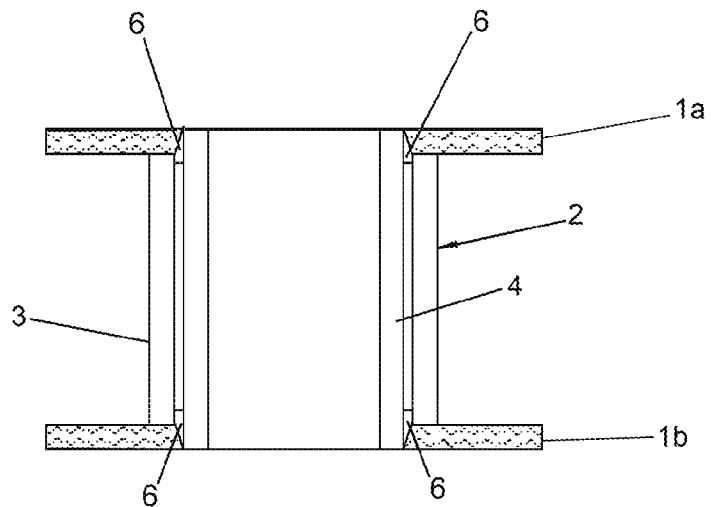
FIG. 7 shows a similar view to the one shown in the preceding figures wherein the ends of the inner tubular body are embedded in through openings of the top and bottom platforms of the pallet.

The arrangement of the laminar elements of the pallet is important given that the separators (2) are fitted flush with the same or in blind openings based on whether the platform (1a, 1b) is made of one layer of laminar elements or several layers of laminar elements, in the latter case the openings (5) being covered by a second layer of laminar elements. The different embodiments are shown in FIGS. 5 to 7.

This way, when mounting the inner tubular body (4), the triangular area of the transverse cross section of the frustoconical geometry of the opening (5) is filled with fastening means (6), such as, for example, mounting adhesive, providing the joint with a strong resistance. Additionally, the end of the inner tubular body (4) can incorporate mounting adhesive for the joining thereof to the laminar elements in the case that the platform (1a, 1b) incorporates several layers of laminar elements and the opening (5) is blind.

To finish the configuration of the separators (5), the outer tubular body is subsequently mounted, to which adhesive is preferably applied to the ends, since they will always be resting against laminar elements of the bottom platform (1a) and top platform (1b).

In any case, the fastening means (6) the pallet incorporates in the openings (5) can extend so that they protrude from the opening (5) and serve as a joint between the inner tubular bodies (4) and the outer tubular bodies (3), considerably increasing the joining effect of the two tubular bodies (3, 4) to one another and to the platforms (1a, 1b).

Figure 8:
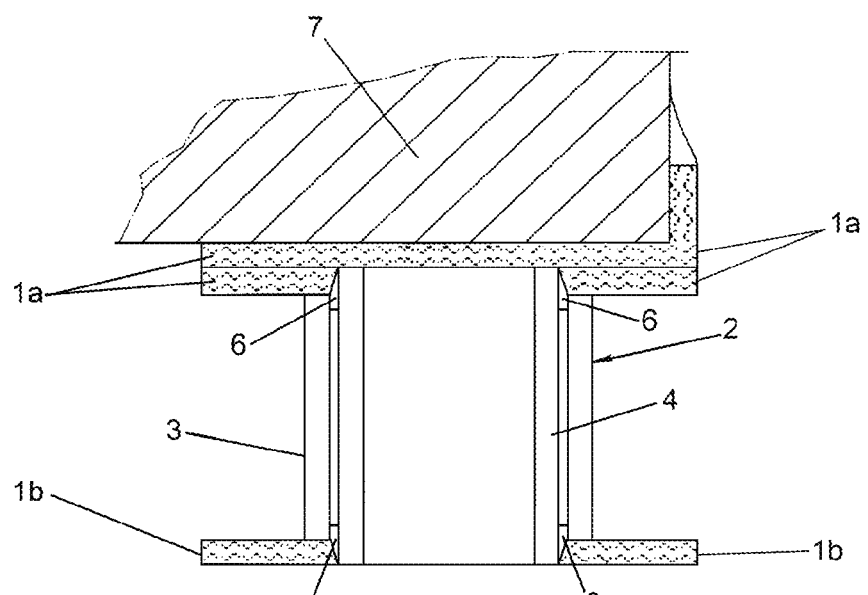
FIG. 8 shows a view of a part of a pallet with protective flaps, showing a load.

From the description of the present specification, it may be concluded that the novelty presented by the cardboard pallet of the disclosure is only focused on the area of the openings (5) and the separators (2), and as such it may be understood that the disclosure can be applied to any type of cardboard pallet, regardless of whether it incorporates additional elements for securing the load (7), as shown in FIG. 8, or any other type of alternative configuration with respect to the platforms (1a, 1b).

The present disclosure should not be limited to the embodiment herein described. Other arrangements may be carried out by those skilled in the art based on the present description.

The invention claimed is:

1. A recyclable cardboard pallet which comprises a top platform and a bottom platform, each platform comprising at least one layer of laminar elements, and the platforms arranged in parallel planes, wherein the at least one layer of laminar elements of each platform comprises openings configured for the insertion of separators comprising an outer tubular body and an inner tubular body concentric with the outer tubular body and having a greater length, wherein:
   the openings have a frustoconical configuration,
   the inner tubular body has an outer diameter of a dimension configured relative to a smallest diameter of the opening, such that the outer diameter of the inner tubular body fits flush with laminar elements between which it is located,
   the outer tubular body has an inner diameter of a dimension that is greater than or equal to a largest diameter of the opening, such that ends of the outer tubular body rest completely on laminar elements between which it is placed,
   a gap of the frustoconical configuration of the opening comprises fastening elements configured to provide a joint with a resistance.

2. The recyclable cardboard pallet according to claim 1, wherein the openings are configured to be selected between blind openings and through openings.

3. The recyclable cardboard pallet according to claim 2, wherein the fastening elements protrude from the opening and are further configured to enter an opening between the tubular bodies and join the outer tubular body and the inner tubular body.

4. The recyclable cardboard pallet, according to claim 1, wherein the fastening elements comprise a mounting adhesive.

* * * * *

UNITED STATES PATENT AND TRADEMARK OFFICE
CERTIFICATE OF CORRECTION

PATENT NO. : 10,800,575 B2
APPLICATION NO. : 16/339745
DATED : October 13, 2020
INVENTOR(S) : Sergio Altur Sánchez Page 1 of 1

It is certified that error appears in the above-identified patent and that said Letters Patent is hereby corrected as shown below:

On the Title Page

Column 1, Item (60), Delete "Related U.S. Application Data (60) Provisional application No. PCT/ES2017/070377, filed on May 31, 2017"

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*